(12) United States Patent
Meunier

(10) Patent No.: US 9,322,941 B2
(45) Date of Patent: Apr. 26, 2016

(54) SWEEP DESIGN FOR SEISMIC SOURCES

(71) Applicant: CGGVERITAS SERVICES SA, Massy Cedex (FR)

(72) Inventor: Julien Meunier, Paris (FR)

(73) Assignee: CGGVERITAS SERVICES SA, Massy (FR)

( * ) Notice: Subject to any disclaimer, the term of this patent is extended or adjusted under 35 U.S.C. 154(b) by 577 days.

(21) Appl. No.: 13/755,261

(22) Filed: Jan. 31, 2013

(65) Prior Publication Data

US 2013/0201799 A1 Aug. 8, 2013

Related U.S. Application Data

(60) Provisional application No. 61/593,994, filed on Feb. 2, 2012.

(51) Int. Cl.
*G01B 1/00* (2006.01)
*G01V 1/143* (2006.01)
*G01V 1/00* (2006.01)
*G01V 1/37* (2006.01)

(52) U.S. Cl.
CPC ............... *G01V 1/143* (2013.01); *G01V 1/005* (2013.01); *G01V 1/37* (2013.01)

(58) Field of Classification Search
CPC .................................................... G01V 1/005
USPC .................................................. 367/49, 189
See application file for complete search history.

(56) References Cited

U.S. PATENT DOCUMENTS

| | | | |
|---|---|---|---|
| 6,181,646 B1 * | 1/2001 | Bouyoucos et al. | 367/189 |
| 6,418,079 B1 * | 7/2002 | Fleure | 367/40 |
| 7,327,633 B2 | 2/2008 | Bagaini et al. | |
| 7,330,401 B2 * | 2/2008 | Jeffryes et al. | 367/189 |
| 8,274,862 B2 | 9/2012 | Sallas | |
| 2010/0070101 A1 | 3/2010 | Benes et al. | |
| 2010/0091625 A1 | 4/2010 | Mimouni et al. | |
| 2011/0085416 A1 | 4/2011 | Sallas | |

OTHER PUBLICATIONS

C. Bagaini, "Enhancing the Low-Frequency Content of Vibrissa Data with Maximum Displacement Sweeps," Presented at the 69th EAGE Conference & Exhibition, London UK, Jun. 11-14, 2007.
Dave Howe et al., "Independent simultaneous sweeping—a method to increase the productivity of land seismic crews" presented at the 78th Annual International Meeting, SEG Las Vegas 2008, Nov. 9-14, 2008, pp. 2826-2830.
J. Meunier, Seismic Acquisition from Yesterday to Tomorrow: 2011 distinguished instructor short course, series No. 14, 2011, SEG European Association of Geoscientist & Engineers.
D. Mougenot et al., "High resolution Vibroseis in the Paris Basin" EAGE 64th Conference & Exhibition, Florence, Italy, May 27-30, 2002.

(Continued)

*Primary Examiner* — Ian J Lobo
(74) *Attorney, Agent, or Firm* — Patent Portfolio Builders PLLC

(57) ABSTRACT

A system and method are described herein for generating a frequency sweep signal set for use in seismic data gathering. Low frequency sweep rate modifications are combined to compensate for vibrator limitations and vibrator far-field responses with high frequency sweep rate modifications to compensate for absorption, and then the frequency sweep signal set is generated based on the combination of high and low frequency sweep rate modifications.

24 Claims, 13 Drawing Sheets

(56) References Cited

OTHER PUBLICATIONS

Peter Pecholcs et al., "Over 40,000 Vibrator points per day with real-time quality control: Opportunities and Challenges" SEG 2010 Annual Meeting, Denver, Oct. 17-20, 2010.
Jean-Jacques Postel et al., "V1: Implementation and application of single-vibrator acquisition" The Leading Edge, 27, No. 5, May 2008, pp. 604-608.
E. Schissele et al., "Seismic Repeatability—Is There a Limit?" Presented at the 69th EAGE Conference & Exhibition.
Mexican Communication dated Sep. 8, 2015, in related Mexican Application No. MX/a/2013/001359.
Office Action mailed Dec. 15, 2014 in related AU Application No. 2013200589.

* cited by examiner

- LENGTH: 4 s
- START FREQUENCY: 1 Hz
- END FREQUENCY: 12 Hz
- START TAPER: 0.8 s
- END TAPER: 0.8 s
- FREQUENCY: 1  4  8  12  (Hz)
- AMPLITUDE: 6  0  0  9  (dB)

SWEEP DESIGN FOR SEISMIC SOURCES

PRIORITY INFORMATION

The present application claims priority under 35 U.S.C. §119(e) to U.S. Provisional Patent Application Ser. No. 61/593,994, filed Feb. 2, 2012, the entire contents of which are expressly incorporated herein by reference.

TECHNICAL FIELD

The present exemplary embodiments relate generally to sweep frequency design for seismic data acquisition and, more particularly, to mechanisms and techniques for improved sweep designs to be used in seismic data acquisition.

BACKGROUND

Seismic waves generated artificially for the imaging of geological layers has been used for more than 50 years. The most widely used waves are by far reflected waves and more precisely reflected compressional waves. During seismic prospection operations, vibrator equipment (also known as a "source") generates a vibro-seismic signal that propagates in particular in the form of a wave that is reflected on interfaces of geological layers. These waves are received by geophones, or receivers, which convert the displacement of the ground resulting from the propagation of the waves into an electrical signal recorded by means of recording equipment. Analysis of the arrival times and amplitudes of these waves makes it possible to construct a representation of the geological layers on which the waves are reflected.

Sweep design pertains to the choice of frequencies used to drive the sound producing device used for determining the possible or probable location of hydrocarbon deposits under, e.g., land surface or the ocean floor. The sound producing device in such an application can be referred to as a vibrator, and is generally also called the "source," i.e., the source of the sound waves that are transmitted and then reflected by various geological interfaces and then received by one or more, usually dozens, of receivers. In one particular method of use, the sources are referred to as vibrators when used off shore, for exploration under the ocean floor.

FIG. 1 depicts schematically a device for transmitting and receiving vibro-seismic waves intended for seismic exploration in a land environment. The device comprises a source consisting of a vibrator 1 operable to generate a seismic signal, a set of receivers 2 (or geophones) for receiving a seismic signal and converting it into an electrical signal and a recorder 3 for recording the electrical signals generated by the receivers. The source 1, the receivers 2 and the recorder 3 are positioned on the surface of the ground 5. FIG. 1 depicts a single vibrator but it should be understood that the source may be composed of several vibrators, as is well known to persons skilled in the art.

In operation, source 1 is operated so as to generate a vibro-seismic signal. This signal propagates firstly on the surface of the ground, in the form of surface waves 4, and secondly in the subsoil, in the form of waves 6 that generate reflected waves when they reach an interface 7 between two geological layers. Each receiver 2 receives both a surface wave 4 and a reflected wave 6 and converts them into an electrical signal in which are superimposed the component corresponding to the reflected wave and the one that corresponds to the surface wave, which is undesirable and which is to be filtered.

One class of sources that can be used is vibratory sources. Vibratory sources, including hydraulically powered sources and sources employing piezoelectric or magnetostrictive material, have been used in seismic operations. A vibrator generates a long tone with a varying frequency, i.e., a frequency sweep. This signal is applied to a moving part, e.g., a piston, which generates a corresponding seismic wave. Instantaneous pressure resulting from the movement of plural pistons corresponding to plural vibrators may be lower than that of an airgun array, but total acoustic energy transmitted by the vibrator may be similar to the energy of the airgun array due to the extended duration of the signal. However, such sources need a frequency sweep to achieve the required energy. The design of the frequency sweep will now be discussed.

A sweep is a sinusoid with a continuously variable frequency, and can be defined by its amplitude $A(f)$ and its sweep rate $Sr(f)$ defined as the derivative of the frequency relative to time $df/dt$. Provided the sweep is long enough (longer than 5 or 6 seconds), the amplitude spectrum of the sweep at frequency f is proportional to $A(f)$ and to the square root of $1/Sr(f)$. Target-oriented sweep design (i.e., searching for a particular known type of hydrocarbon, in a particular known type of geological formation) consists in defining $A(f)$ and $Sr(f)$ to obtain the desired Signal-to-Noise ratio (SNR) of the target reflection.

Non-linear sweeps were introduced in late 1970s. At that time, the purpose of these sweeps was to generate a higher proportion of high frequencies that are attenuated by non-elastic wave propagation. The limited flexibility of the available software allowed the choice between a very small amplification, which did not significantly differ from conventional linear sweeps, and larger amplifications, which being constant over the entire frequency range often resulted in a damaging reduction in the low frequency content. This drawback was noticed and more sophisticated electronics were developed to allow more flexibility. An example of such a technique contributing to an enhancement was shown by D. Mougenot in 2002, as shown in FIG. 2. FIG. 2 illustrates a comparison of conventional (line A) and segmented logarithmic sweeps (line B). It can be readily observed in FIG. 2 that line A represents a linear rate of change of the sweep frequency, beginning at about 10 Hz, and changing linearly to about 120 Hz, over a 20 second period of time. Note that the relative amplitude of the transmitted signal also changes over time, from about 10-15 dB to about 55 dB by the end of the sweep period. The sweep proposed by Mougenot and Meunier in 2002 began at about 10 Hz, and proceeds to about 43 Hz over a two second period of time, but at about a constant (or linear) gain of 35 dB. Then, the sweep frequency changes from about 43 Hz to about 71 Hz over a two second period of time, and changes in amplitude from about 35 dB to about 37-38 dB. Finally, in the last phase, the sweep frequency changes from about 71 Hz at about 37-38 dB to 133 Hz and just over 60 dB in a 26 second time period. With such a change in the amplitude and frequencies over time, some gains were realized in maintaining low frequency content, without sacrificing the higher frequency affects. However, even with the realized benefits, there remained problems with the sweep frequencies.

In 2007, C. Bagaini, in a paper entitled "Enhancing the Low-Frequency Content of Vibroseis Data with Maximum Displacement Sweeps," the entire contents of which are hereby incorporated by reference, and which was presented at the 69th EAGE Conference & Exhibition, discussed modifying the sweep rate of land vibrators to compensate for stroke limitations in the low frequencies. As those of ordinary skill in the art can appreciate, "stroke" pertains to the movement of an oscillating piston in a vibrator that produces the sound wave underwater. An extension of this approach was proposed by J. Sallas in 2009, in U.S. Published Patent Application No. 2011-0085416, entitled "System and Method for Determining a Frequency Sweep for Seismic Analysis," the entire contents of which are hereby incorporated by reference. Low frequency limitations are not restricted to land seismic. The difficulty of moving the reaction mass along a longer distance to obtain low frequencies from a land vibrator is very similar to the difficulty of moving a larger volume of water to obtain low frequencies from a marine vibrator.

A sweep design method for a seismic land vibrator is also disclosed in U.S. Pat. No. 7,327,633, entitled, "Systems and methods for enhancing low-frequency content in Vibroseis acquisition," the entire content of which is incorporated herein. The patent discloses a method for optimizing sweep signal strength by taking into account a single physical property of a seismic land vibrator, i.e., a stroke limit of the seismic vibrator device. A non-linear sweep is obtained in order to build up the sweep spectral density to achieve a targeted spectrum in the low frequency range. However, other physical properties of the seismic land vibrator, which limit the operation of the land vibrator, are not considered. Further, this patent is directed to a land vibrator, which is different from a marine vibrator.

A more sophisticated sweep design method is disclosed in U.S. patent application Ser. No. 12/576,804, entitled, "System and method for determining a frequency sweep for seismic analysis," the entire content of which is incorporated herein by reference. This method takes into account not only the plate stroke limit but also other constraints of the land vibrator, e.g., the pump flow limit and the servo valve flow limit. However, this method addresses a land vibrator, which has different characteristics than a marine vibrator, and the method also does not take into consideration specific features of the water environment.

Accordingly, it would be desirable to provide methods, modes and systems for the design of sweep that takes into account constraints of the vibrator and, optionally, constraints imposed by the water environment.

SUMMARY

It is therefore a general aspect of the exemplary embodiments to provide a transceiver that incorporates a sweep design that will obviate or minimize problems of the type previously described.

According to a first aspect of an exemplary embodiment, a method is provided for generating a frequency sweep signal set for use in seismic data gathering, the method comprising combining low frequency sweep rate modifications to compensate for vibrator limitations and vibrator far-field responses with high frequency sweep rate modifications to compensate for absorption, and generating the frequency sweep signal set based on the combination of high and low frequency sweep rate modifications.

According to the first aspect the step of combining low frequency sweep rate modifications and high frequency rate modifications comprises determining a reference sweep rate from a plurality of reference acquisition parameters, determining a new source radiation parameter $A_r$, determining a new acquisition parameter $A_{acq}$ from the plurality of reference acquisition parameters and a plurality of new acquisition parameter factors, determining an ambient noise acquisition parameter $A_n$, determining a vibrator limitation parameter $A_l$, determining an absorption parameter $A_{abs}$, determining a migration effect parameter $A_m$, and calculating the new sweep rate $Sr_{new}$ based on the reference sweep rate and the determined parameters.

According to the first aspect, the method further comprises determining a reference frequency, and determining a range of reference sweep frequencies, wherein the reference frequency and the range of reference sweep frequencies are used to calculate the parameters. Still further according to the first aspect, the reference noise parameter Nref is determined by taking the median power spectral density of the ambient noise parameter $N_{new}(f)$, or by determining $N_{ref}$ equals $N_{new}(f_{ref})$.

According to the first aspect, the step of determining a new source radiation parameter $A_r$ comprises calculating the equation $$A_r = \frac{f}{f_{ref}}.$$

According to the first aspect, the step of determining a new acquisition parameter $A_{acq}$ comprises calculating the equation $$A_{acq} = \frac{Pf_{new}D_{new}Nv_{new}\sqrt{Nr_{new}Sd_{new}Ra_{new}}}{Pf_{ref}D_{ref}Nv_{ref}\sqrt{Nr_{ref}Sd_{ref}Ra_{ref}}}.$$

According to the first aspect, the step of determining an ambient noise acquisition parameter $A_n$ comprises calculating the equation $$A_n = \sqrt{\frac{N_{ref}}{N_{new}(f)}}.$$

According to the first aspect, the step of determining a vibrator limitation parameter $A_l$ comprises calculating the equation $$A_l = \frac{\rho_{fs}(f)}{\rho_{fs}(f_{ref})}.$$

According to the first aspect, the step of determining an absorption parameter $A_{abs}$ comprises calculating the equation $$A_{abs} = \exp\left(\frac{-\pi t_t}{Q_a}(f - f_{ref})\right).$$

According to the first aspect, the step of determining a migration effect parameter $A_m$ comprises calculating the equation $$A_m = \frac{m_{new}(f)}{m_{ref}(f_{ref})}.$$

According to the first aspect, the step of calculating the new sweep rate $Sr_{new}$ comprises calculating the equation $$Sr_{new} = Sr_{ref}(A_{acq}A_nA_{abs}A_lA_m)^2.$$

According to the first aspect, the method further comprises providing the frequency sweep signal to a seismic data gathering unit, driving a seismic data gathering source to transmit a drive signal, receiving seismic data based on the transmitted drive signal by a receiver, and analyzing the received seismic data to determine the presence or not of hydrocarbon deposits.

According to a second aspect of an exemplar embodiment a system for generating a frequency sweep signal set for use in seismic data gathering is provided comprising a processor configured to combine low frequency sweep rate modifications to compensate for vibrator limitations and vibrator farfield responses with high frequency sweep rate modifications to compensate for absorption, and wherein the processer is further configured to generate the frequency sweep signal set based on the combination of high and low frequency sweep rate modifications.

According to the second aspect, the combining of low frequency sweep rate modifications and high frequency rate modifications comprises the processor being further configured to determine a reference sweep rate from a plurality of reference acquisition parameters, determine a new source radiation parameter $A_r$, determine a new acquisition parameter $A_{acq}$ from the plurality of reference acquisition parameters and a plurality of new acquisition parameter factors, determine an ambient noise acquisition parameter $A_n$, determine a vibrator limitation parameter $A_l$, determine an absorption parameter $A_{abs}$, determine a migration effect parameter $A_m$, and calculate the new sweep rate $Sr_{new}$ based on the reference sweep rate and the determined parameters.

According to the second aspect, the processor is further configured to determiner a reference frequency, and determine a range of reference sweep frequencies, wherein the reference frequency and the range of reference sweep frequencies are used to calculate the parameters.

According to the second aspect, the reference noise parameter Nref is determined by taking the median power spectral density of the ambient noise parameter $N_{new}(f)$, or by determining $N_{ref}$ equals $N_{new}(f_{ref})$.

According to the second aspect, the processor determines a new source radiation parameter $A_r$ by calculating the equation $$A_r = \frac{f}{f_{ref}}.$$

According to the second aspect, the processor determines a new acquisition parameter $A_{acq}$ by calculating the equation $$A_{acq} = \frac{Pf_{new} D_{new} Nv_{new} \sqrt{Nr_{new} Sd_{new} Ra_{new}}}{Pf_{ref} D_{ref} Nv_{ref} \sqrt{Nr_{ref} Sd_{ref} Ra_{ref}}}.$$

According to the second aspect, the processor determines an ambient noise acquisition parameter $A_n$ by calculating the equation $$A_n = \sqrt{\frac{N_{ref}}{N_{new}(f)}}.$$

According to the second aspect, the processor determines a vibrator limitation parameter $A_l$ by calculating the equation $$A_l = \frac{\rho_{fs}(f)}{\rho_{fs}(f_{ref})}.$$

According to the second aspect, the processor determines an absorption parameter $A_{abs}$ by calculating the equation $$A_{abs} = \exp\left(\frac{-\pi t_t}{Q_a}(f - f_{ref})\right).$$

According to the second aspect, the processor determines a migration effect parameter $A_m$ by calculating the equation $$A_m = \frac{m_{new}(f)}{m_{ref}(f_{ref})}.$$

According to the second aspect, the processor determines the new sweep rate $Sr_{new}$ by calculating the equation $$Sr_{new} = Sr_{ref}(A_{acq} A_n A_{abs} A_l A_m)^2.$$

According to the second aspect, the processor is further configured to provide the frequency sweep signal to a seismic data gathering unit, drive a seismic data gathering source to transmit a drive signal, receive seismic data based on the transmitted drive signal by a receiver, and analyze the received seismic data to determine the presence or not of hydrocarbon deposits.

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
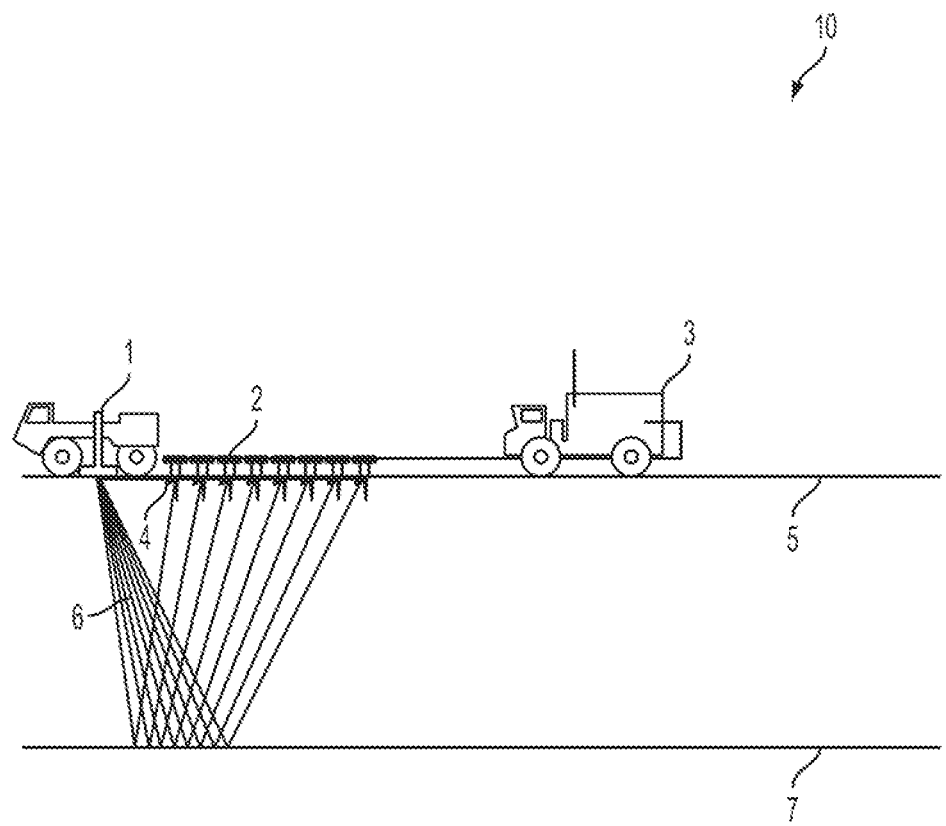
FIG. 1 depicts schematically a device for transmitting and receiving vibro-seismic waves intended for seismic exploration in a land environment.
Figure 2:
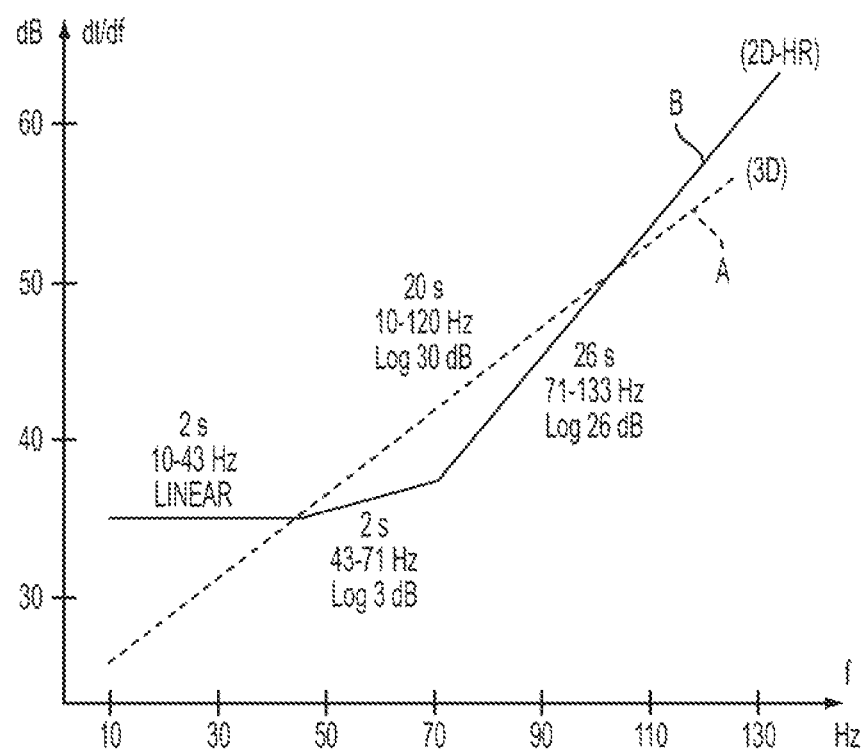
FIG. 2 illustrates a conventional linear sweep and a conventional segmented logarithmic sweep used in conventional sources in seismic data gathering equipment.

The concepts associated with these embodiments are described more fully hereinafter with reference to the accompanying drawings, in which embodiments are shown. In the drawings, the size and relative sizes of layers and regions may be exaggerated for clarity. Like numbers refer to like elements throughout. These concepts may, however, be embodied in many different forms and should not be construed as limited to the embodiments set forth herein. Rather, these embodiments are provided so that this disclosure will be thorough and complete, and will fully convey the scope of these concepts to those skilled in the art. The scope of the exemplary embodiments is therefore defined by the appended claims. The following embodiments are discussed, for simplicity, with regard to a method to generate or design a driving signal for a vibro-acoustic source element and/or a marine source array for achieving a desired target output spectrum in compliance with various constraints of each vibro-acoustic source element and other constraints such as environmental constraints introduced by the marine seismic acquisition. However, the embodiments to be discussed next are not limited to a marine seismic source, but may be applied to other structures that generate a seismic wave having a controlled frequency range.

Reference throughout the specification to "one embodiment" or "an embodiment" means that a particular feature, structure, or characteristic described in connection with an embodiment is included in at least one embodiment of the present exemplary embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: power spectral density (PSD); signal-to-noise ratio (SNR); median power spectral density (MPSD); RAM, ROM, EEPROM, flash memory or other memory technology, CDROM, digital versatile disks (DVD); central processor unit (CPU); random access memory (RAM); read-only memory (ROM); programmable ROM (PROM); erasable PROM (EPROM); input/output circuitry (I/O); vertical seismic profile date (VSP); linear variable differential transformer (LVDT); field programmable gate array structures (FPGAs); application specific integrated circuitry (ASICs); liquid crystal displays (LCDs); global area network (GAN) and cathode ray tubes (CRTs); vertical seismic profile date (VSP); basic input/output system (BIOS); and power spectral density (PSD).

According to an exemplary embodiment, the sweep design discussed herein combines a low-frequency sweep rate modification to compensate for vibrator limitations, a low-frequency modification to compensate for the vibrator far field response, and a high-frequency modification to compensate for absorption, among other modifications as needed.

Throughout the following discussion, the following notations will be used: f is the frequency; $f_s$ is the start frequency of the sweep; $f_e$ is the end frequency of the sweep; SL is the sweep length, or duration (and can be denoted in either time (e.g., 5, 10, 15 seconds) and/or frequency (10 Hz, 15 Hz, 45 Hz, among other examples); Sr(f) is the sweep rate (df/dt), which is the rate at which the frequency changes over time (the sweep rate can also be expressed as a function of time); and correlation operators are presumed to have an amplitude spectrum of 1 within the signal bandwidth.

A sweep is a signal that can be expressed in the following form:

$$S = A_0(t)\cos(\varphi(t)). \qquad (1)$$

In equation 1, $A_0(t)$, the amplitude, is a positive continuous function on interval [0-SL], $\Phi(t)$, the instantaneous phase, is a continuous function of time on this interval, and $$f(t) = \frac{1}{2\pi}\frac{d\varphi}{dt},$$

the frequency, is a continuous function of time on this interval. According to an exemplary embodiment, f(t) will be taken as being monotonous and increasing. As those of ordinary skill in the art can appreciate, if $S_0(t)=1$, the sweep is called a unit amplitude sweep. A unit amplitude sweep is fully defined by its start frequency $f_{min}$ and its sweep rate sr(t).

The instantaneous frequency of a unit amplitude sweep is given by $$f(t) = f_{min} + \int_0^t Sr(\tau)d\tau. \qquad (2)$$

Note that the sweep length SL, the sweep rate Sr(t), the start and end frequencies $f_{min}$ and $f_{max}$ are linked by:

$$f_{max} = f_{min} + \int_0^{SL} Sr(\tau)d\tau. \quad (3)$$

The instantaneous phase of the sweep is $$\varphi(t) = 2\pi \int_0^t f(\tau)d\tau + \varphi_0. \quad (4)$$

The sweep equation (1) then becomes:

$$S(t) = \cos\left[2\pi \int_0^t \left(f_s + \int_0^\theta sr(\tau)d\tau\right)d\theta + \varphi_0\right]. \quad (5)$$

Figure 3:
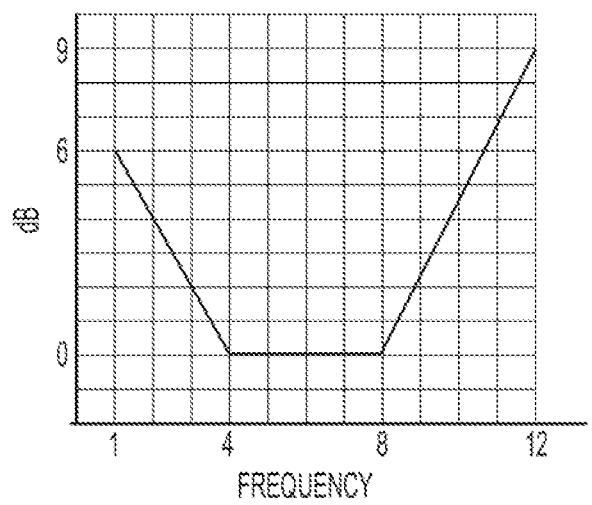
FIG. 3 illustrates an example of sweep parameters in an easy-to-read display for a sweep designed according to an exemplary embodiment, meant to enhance both the low and high frequencies relative to the medium frequency range.

According to an exemplary embodiment, FIG. 3 illustrates an example of sweep parameters in an easy-to-read display for a sweep designed according to exemplary embodiments and meant to enhance both the low and high frequencies relative to the medium frequency range. The duration of the designed sweep in FIG. 3 is 4 seconds (sec.), the start frequency is 1 Hz, and end frequency is 12 Hz (for a sweep rate of 12/3=4 Hz/sec.). In addition, the start taper is 0.8 sec., the end taper is also 0.8 sec., and the amplitude ranges from 6 dB to 0 dB and up again to 9 dB. Start taper refers to the time the designed sweep increases from 0 to its nominal amplitude, and end taper is the time the designed sweep takes to decrease from its nominal amplitude to 0.

Figure 4A:
FIGS. 4A-4C provide rate, frequency and sweep data for the sweep designed according to exemplary embodiments and as shown in FIG. 3 and, for comparison purposes, the same type of data for a substantially purely linear frequency sweep.
Figure 4B:
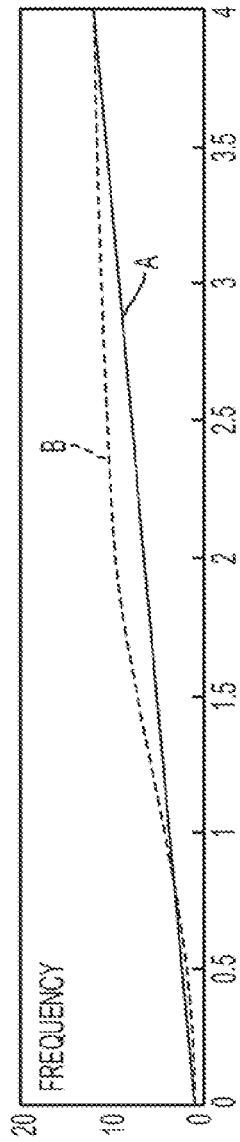
Figure 4C:
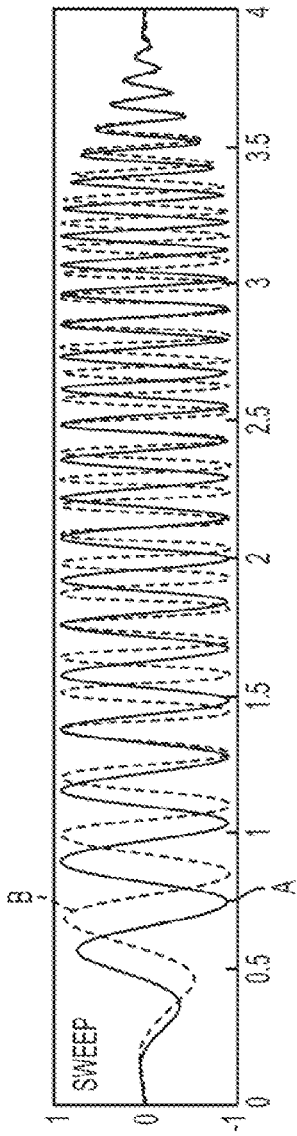

FIGS. 4A-4C provide rate, frequency and sweep data for the sweep designed according to exemplary embodiments and as shown in FIG. 3 and, for comparison purposes, the same type of data for a substantially purely linear frequency sweep. FIG. 4A illustrates a first linear sweep rate, line A. FIG. 4A also illustrates a second sweep rate for the designed sweep that is meant to enhance both the low and high frequencies relative to the medium frequency range. FIG. 4B illustrates a corresponding frequency versus time (f-v-t) plot, wherein line A is the f-v-t data for the linear sweep from 1 Hz to 12 Hz in four seconds, and line B is the f-v-t data for the designed sweep that enhances the low and high frequencies relative to the medium frequency. FIG. 4C illustrates the actual time domain sweep signals for both cases, wherein line A is the linear sweep and line B is the designed sweep meant to enhance low and high frequencies relative to the medium frequency. Differences in the rate of frequency increase can be seen at the beginning and at the end of each of the sweeps.

It can be shown, using the stationary phase approximation, that the amplitude spectrum of a sweep with sweep rate df/dt=Sr(f) is $$A_f = \frac{1}{2}\sqrt{\frac{1}{Sr(f)}}. \quad (6)$$

As can be appreciated by those of ordinary skill in the art, most computer programs ignore the input sampling interval when calculating the Fourier transform. Accordingly, it will be necessary to divide the right member of equation 6 by $Si_t$ to verify this equation, wherein such division corrects the usual omission of the sampling interval that exists in most commercially available math software products. Thus, it has been shown that the amplitude spectrum of a sweep is proportional to the square root of its inverse sweep rate.

It is well known in the art as a result of abundant experimentation with low energy sources, that Signal-to-ambient-Noise ratios can be made proportional to the square root of the order of the summation, regardless of the signal amplitude. See, for example, Schissele et al., "Seismic Repeatability—Is There a Limit?", presented at the 69th EAGE Conference & Exhibition, 2009, the entire contents of which are incorporated herein by reference. These experiments support the statement that penetration and Signal-to-(ambient)-Noise ratio are two facets of the same frequency-dependent phenomenon:

If S/N (ambient) at frequency $f_1>1$, the reflection is seen at this frequency; the corresponding interface is then "penetrated".

If S/N (ambient) at frequency $f_1 1$, the reflection is not seen at this frequency; the corresponding interface is not penetrated.

According to an exemplary embodiment, the sweep design problem consists in obtaining an adequate S/N ratio over as wide a frequency range as possible. However, as those of ordinary skill in the art can fairly appreciate, "adequate" is, or can be, quite subjective; in the context of determining an adequate S/N ratio, it means neither too high nor too low. More particularly, and in regard to the exemplary embodiments discussed herein, adequate refers to a reference acquisition, which, for a given target reflection, provides acceptable S/N ratio at a reference frequency, $f_{ref}$. One example of an acceptable S/N ratio is when the signal of interest can be interpreted while it could not be if the signal level were slightly lower. The subscript ref will be used for the reference acquisition and the subscript new will be used for the new acquisition. According to a preferred exemplary embodiment, systems and methods disclosed herein determine the sweep rate design factors, defined and discussed in greater detail below, that are then multiplied against the reference S/N ratio to determine a new sweep rate. According to a further exemplary embodiment, the new acquisition will preferably have a wider frequency range. The sweep rate design factors include: acquisition parameters ($A_{acq}$), ambient noise ($A_n$), absorption ($A_{abs}$), source radiation ($A_f$), vibrator limitations ($A_l$), and migration effects ($A_m$), each of which will be discussed in greater detail below.

Acquisition parameters. The effect of acquisition parameters can best be described by the frequency-independent scalar:

$$A_{acq} = \frac{Pf_{new}D_{new}Nv_{new}\sqrt{Nr_{new}Sd_{new}Ra_{new}}}{Pf_{ref}D_{ref}Nv_{ref}\sqrt{Nr_{ref}Sd_{ref}Ra_{ref}}}, \quad (7)$$

wherein Pf is the peak force, D the drive, Nv the number of vibrators, Nr the number of receivers per streamer vessel, Sd the source density and Ra the receiver area (See, Meunier, Meunier, J., 2011, Seismic Acquisition from Yesterday to Tomorrow: SEG Distinguished instructor series no. 14., p. 116, equation 24, the entire contents of which are incorporated herein by reference). As can be appreciated by those of ordinary skill in the art, the scalar $A_{acq}$ does not take into account the effect of the sweep rate (which is to be determined by exemplary embodiments of systems and methods described herein. As briefly discussed above, the acquisition parameters, which is represented in sum by the variable $A_{acq}$, is a frequency independent parameter, meaning that its scalar value is constant over the range of frequencies that are expected to be encountered when the sweep signal is generated. However, as is discussed in greater detail below, all of the remaining parameters discussed below are not frequency independent, that is, they are frequency dependent, such that the value of the parameter is dependent on the frequency that is being used in the sweep signal. According to a further exemplary embodiment, the frequency range is determined as a cost quality compromise resulting from a combination of all of the "A" factors.

Ambient noise. The ambient noise factor in the S/N ratio is the denominator. It is assumes that the ambient noise factor behavior can be described by its power spectrum density (PSD), N(f):

$$A_n = \sqrt{\frac{N_{ref}}{N_{new}(f)}}. \tag{8}$$

$N_{ref}$ is the power spectral density (PSD) of ambient noise at the reference frequency (the frequency for which S/N ratio of the reference acquisition was adequate.

Absorption. The amplitude of the target reflection at time $t_r$ is assumed to be described by a single "average" quality factor $Q_a$. The effect of the absorption factor is given by:

$$A_{abs} = \exp\left(\frac{-\pi t_t}{Q_a}(f - f_{ref})\right). \tag{9}$$

Source radiation. As demonstrated by Miller and Pursey, the source radiation factor $A_r$ results in a 6 dB/octave amplification when seismic data represent particle velocity or pressure. $A_r$ is given as follows:

$$A_r = \frac{f}{f_{ref}}. \tag{10}$$

Vibrator limitations. According to an exemplary embodiment, it is presumed that the vibrator limitations can be described by the ratio, $\rho_{fs}(f)$, of the admissible-to-nominal amplitudes. The admissible amplitude is that amplitude that is the maximum amplitude that can be generated by the particular vibrator, and the nominal amplitude is the actual sweep amplitude of the vibrator during the new acquisition. Therefore, the sweep rate design factor vibrator limitation $A_l$ comprises two parts: a numerator that is a ratio of admissible to nominal amplitudes at the sweep frequency f, and a denominator that a ratio of admissible to nominal amplitudes at the reference frequency. $A_l$ is given as follows:

$$A_l = \frac{\rho_{fs}(f)}{\rho_{fs}(f_{ref})}. \tag{11}$$

Migration effects. If the noise is uncorrelated and there is no anti-alias filter in the operator, the migration effect on signal amplitude is comparable to the effect of the sum of the signals in a Fresnel zone and the effect on noise to the effect of the sum of noise in the frequency-independent migration aperture. Since the area of a Fresnel zone is inversely proportional to frequency, this results in a 6-db/octave reduction. In the case of inadequate spatial sampling, the migration operator may become aliased; the effect of anti-alias filtering of the operator is to reduce the noise summation domain and in turn reduce noise (and migration accuracy) for the relevant frequencies. Moreover, in the very low frequency range (below about 4 or about 5 Hz), ambient noise is often correlated on large distances; its sum has therefore a higher amplitude than if it were fully uncorrelated. This may result in a complex expression that can be expressed as m(f):

$$A_m = \frac{m_{new}(f)}{m_{ref}(f_{ref})}. \tag{12}$$

Note that when the new and the reference spatial samplings are different, $m_{new}$ and $m_{ref}$ are different.

Figure 5:
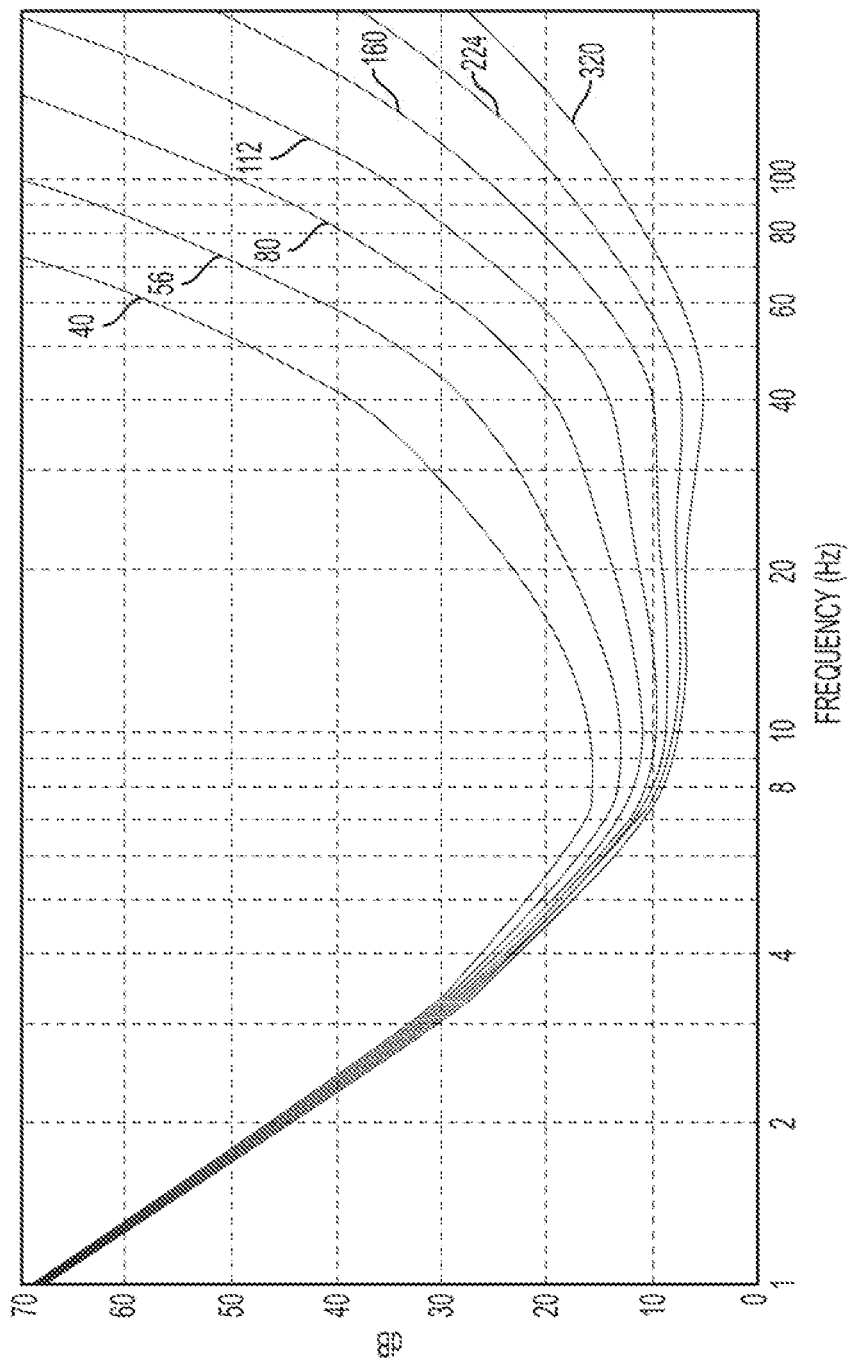
FIG. 5 illustrates the amplification necessary to compensate for the combination of a plurality of signal-to-noise factor in the case of a vibrator and target depth used in the example discussed in regard to Table 1, and for various average quality factors (Qa) between 40 and 320 according to an exemplary embodiment.

FIG. 5 illustrates the amplification necessary according to an exemplary embodiment to compensate for the combination of the signal-to-noise factors discussed above in the case of a vibrator and target depth used in the example discussed in regard to Table 1 below, and for various average quality factors (Qa) between 40 and 320. The amplification is about 70 dB at 1 Hz for all values of quality factors Qa and decreases from about 60 to about 8 dB at 60 Hz when the quality factor increases from 40 to 320.

According to a preferred embodiment, to provide a flat signal spectrum of the target reflection, the sweep rate (which is inversely proportional to the source amplitude spectrum squared) can be determined in accordance with equation 13:

$$Sr_{new} = Sr_{ref}(A_{acq}A_nA_{abs}A_rA_lA_m)^2 \tag{13}$$

Figure 6:
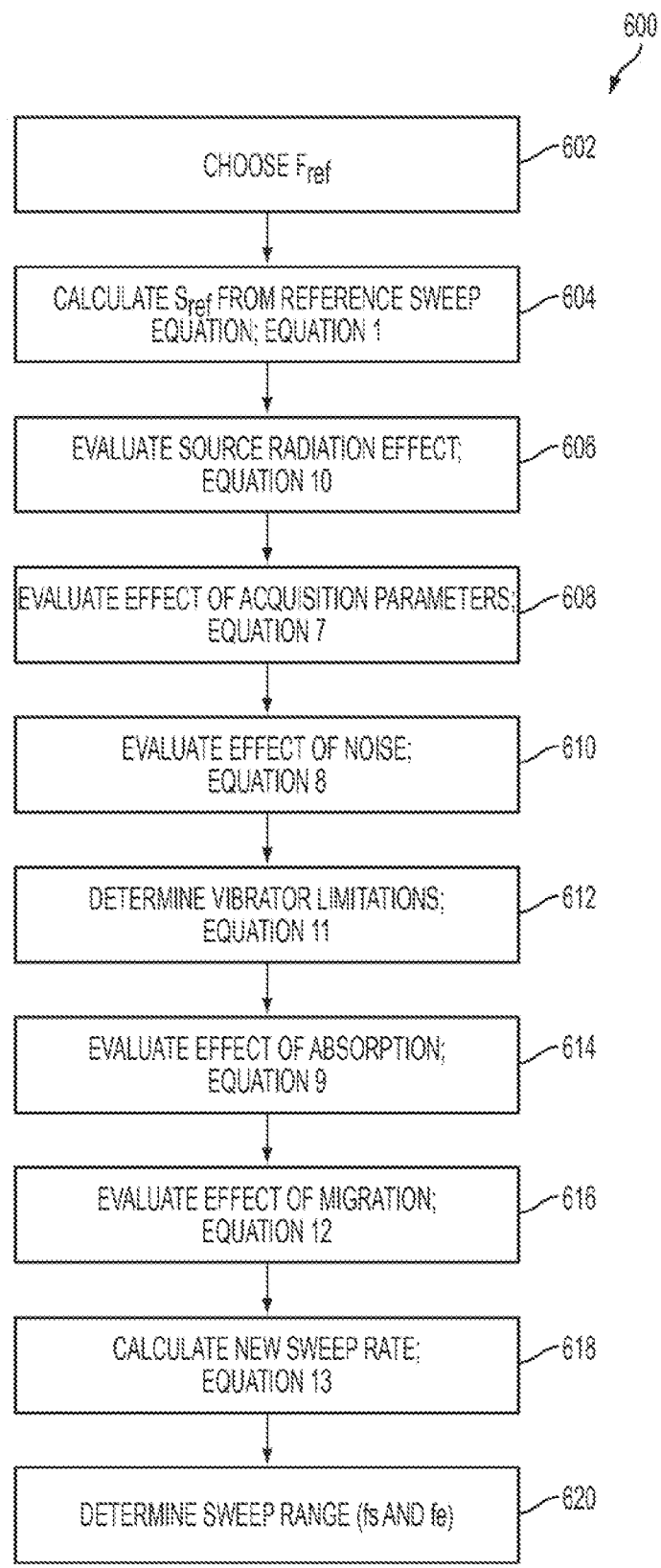
FIG. 6 illustrates a flow chart of a method for the determination of a sweep rate that combines low-frequency sweep rate modifications to compensate for vibrator limitations, low-frequency modifications to compensate for vibrator farfield response characteristics, and high-frequency modifications to compensate for absorption according to an exemplary embodiment.

FIG. 6 illustrates a flow chart of a method 600 for the determination of a new sweep rate $Sr_{new}$ that combines low-frequency sweep rate modifications to compensate for vibrator limitations, low-frequency modifications to compensate for vibrator far-field response characteristics, and high-frequency modifications to compensate for absorption according to an exemplary embodiment. According to an exemplary embodiment, method 600 begins with step 602, wherein the reference frequency, $f_{ref}$ is chosen. According to an exemplary embodiment, fief is obtained by an analysis of vintage data: Ideally, $f_{ref}$ is a frequency for which the S/N ratio of vintage seismic image is adequate. That is, the signal-to-noise ratio is neither too low nor too high. It is also convenient to avoid very low frequencies where $\rho_{fs}$, is not 1. Following step 602, method 600 proceeds to step 604, wherein the range of frequencies, f, is selected for the sweep rate design according to an exemplary embodiment. f ranges from $f_1$ to $f_2$, at the sweep rate. such that $Sr_{ref}$ is determined directly from the reference sweep equation at the reference frequency. Method 600 then proceeds to step 606, wherein the source radiation factor Ar is readily obtained from equation 10.

In next step 608, the acquisition parameter $A_{acq}$ is determined from a combination of the reference and new acquisition parameters using equation (7). In step 610, the noise factors $N_{new}(f)$ and $N_{ref}$ are determined. According to an exemplary embodiment, it is necessary to have an ambient noise analysis in the geographic area. According to a further exemplar embodiment, the ambient noise analysis should cover various noise conditions. As a result, $N_{new}(f)$ is then a median power spectral density (MPSD) of the noise. In general, $N_{ref}$ can be taken as $N_{new}(f_{ref})$. Once the noise analysis has been completed and $N_{new}(f)$ and $N_{ref}$ are determined, $A_n$, the ambient noise factor can be determined according to equation 8.

In step 612, which follows step 610 of method 600 according to an exemplary embodiment, $f_c$ and $\rho_{fs}$ are determined, and then the vibrator limitation factor $A_l$ is calculated using those values using equation 11. As discussed above the frequency $f_c$ is defined as the maximum frequency at which a high drive may be used safely, and $\rho_{fs}$ is defined as a ratio of vibrator amplitudes. According to an exemplary embodiment, $\rho_{fs}$ is obtained from the vibrator characteristics by following the procedure outlined below:

The vibrator pump can move the mass to its full stroke above frequency, $f_{flow}$; its maximum stroke is large enough to generate its nominal force above frequency $f_{stroke}$.

$$\text{If } f_{sf} = \frac{f_{stroke}^2}{f_{flow}}$$

$$\rho_{fs}(f) = (f/f_{stroke})^2 \quad \text{for } f < f_{sf}$$
$$\rho_{fs}(f) = (f/f_{flow}) \quad \text{for } f > f_{sf} \text{ and } f < f_{flow}$$
$$\rho_{fs}(f) = 1 \quad \text{for } f > f_{flow}.$$

According to further exemplary embodiment, it is therefore often advantageous to also apply an amplitude limitation whenever the frequency exceeds a given threshold, for example, $f_c$, to avoid coupling problems while maintaining a higher drive level. Therefore, $$\rho_{fs}(f) = (f_c/f)^k \text{ for } f > f_c$$

with exponent k in the range of ¼ to ½.

Method 600 then proceeds to step 614, wherein the quality factor $Q_a$ is determined. Determination of $Q_a$ according to an exemplary embodiment is based on an estimation using vintage data. According to an exemplary embodiment, use of vertical seismic profile date (VSP) data will allow observation of the upper frequency range and provide a more reliable estimate. As those of ordinary skill in the art can appreciate, vertical seismic profile data is generated from a collection of seismograms recorded from the surface to a borehole. Routine well-based measurements such as rock cuttings and electric logs record local information, often just centimeters from the well. However, it is well known that the earth is not ideally uniform in the horizontal direction, and at some unknown distance from the well the "ideal uniformity" falls short of reality. VSP data provides an intermediary source of information about lateral continuity (i.e., it is not as accurate as "bore hole" data, but is better than most, if not all, other types of estimates). Once $Q_a$ is determined from the VSP data, then the absorption factor $A_{abs}$ can be determined. Following step 614, method 600 proceeds to step 616 where the migration effects are determined, and the migration factor $A_m$ is determined according to equation 12. Following step 616, in step 618, the new sweep rate, $Sr_{new}$ can be determined according to equation 13, as discussed above.

According to an exemplary embodiment, method 600 is used to generate a new sweep rate $Sr_{new}$ following acquisition of the reference data as described below, in step 620, in order to show an example of how the systems and methods discussed herein operate.

The reference data acquisition system $10_{ref}$ utilized 2400 live stations on 12 lines, and an array of 4 200-kN vibrators. Each receiver array covers 50 m², and the sweep frequencies, starting from 8 Hz and ending at 88 Hz, was performed in a linear manner over a 16 second interval. The receivers were spaced 50 m apart, with a line interval of 200 m, and a VP interval of 50 m. The source line interval was also 200 m. According to an exemplary embodiment, the new data acquisition system $10_{new}$, utilized 40,000 live stations on 100 lines, and a single 300-kN vibrators. Each receiver array covers 25 m², and the sweep frequencies, starting from 8 Hz and ending at 88 Hz, was performed in a linear manner over a 16 second interval. The receivers were spaced 25 m apart, with a line interval of 100 m, and a VP interval of 25 m. The source line interval was also 100 m. Their relevant parameters are:

TABLE 1

|  | Pf (kN) | D (%) | Nv (#) | Sd (/km²) | Nr (#) | Ra (m²) |
|---|---|---|---|---|---|---|
| Ref | 200 | 70 | 4 | 100 | 2400 | 2500 |
| New | 300 | 80 | 1 | 400 | 40000 | 625 | where Pf is the peak drive force, D is the drive efficiency (of the vibrator), Nv is the number of vibrators, Sd is the source density, Nr is the number of receivers, and Ra is the receiver area (i.e., the effective area for which the receiver can discern or detect signals).

Analysis of the reference acquisition data (i.e., implementing method 800) leads to $f_{ref}$=50 Hz and $Q_a$=90 for the target at time $t_t$=1.4 s.

Figure 7:
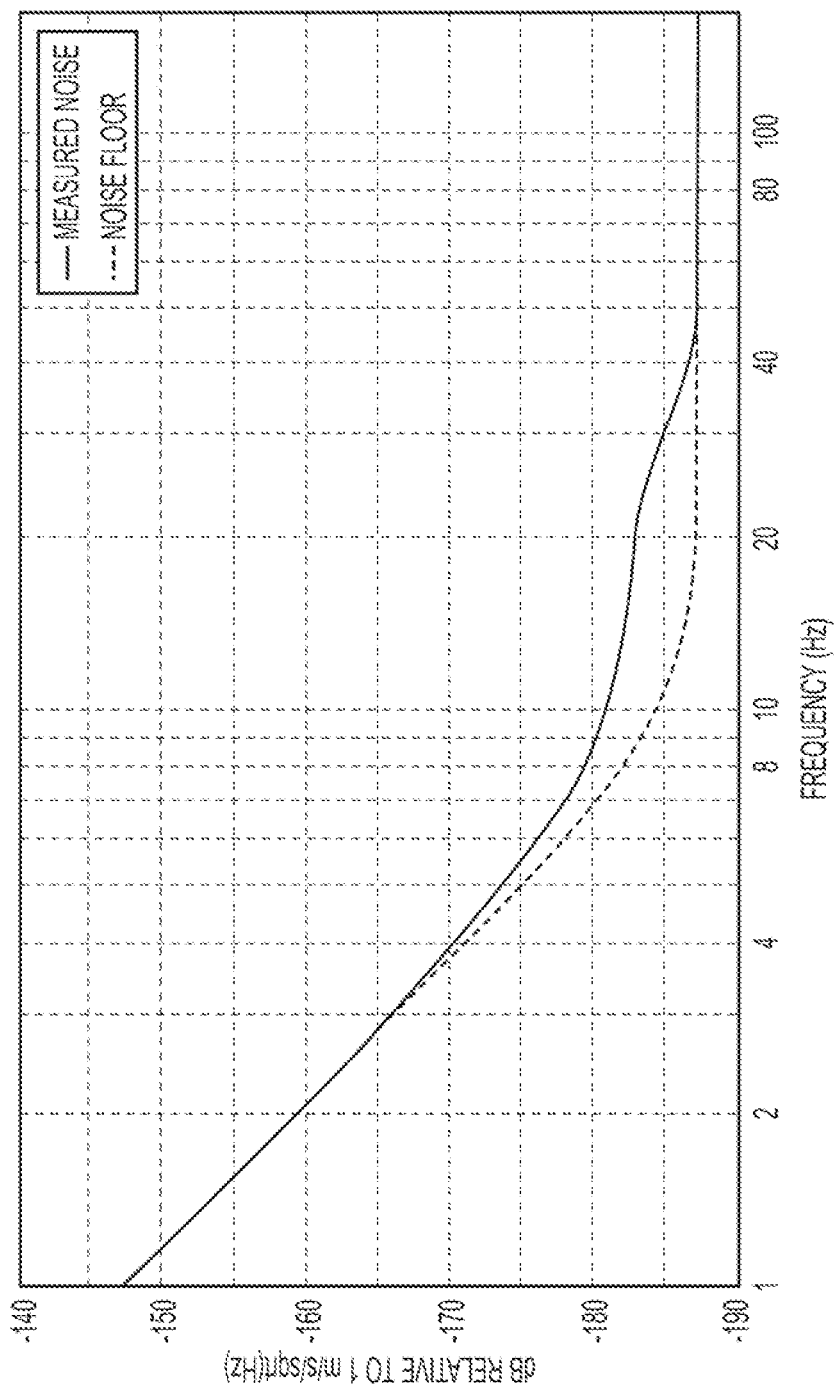
FIG. 7 illustrates a noise power spectral density of instrumentation and a reference measurement for use with a method for determining a new sweep frequency according to an exemplary embodiment.

The noise PSD is shown in FIG. 7. FIG. 7 illustrates the noise power spectral density of instrumentation (dashed line) and a reference measurement (solid line) for use with a method for determining a new sweep frequency according to an exemplary embodiment. In this case, seismic noise is larger than instrument noise in the 4-40 Hz frequency range.

Figure 8:
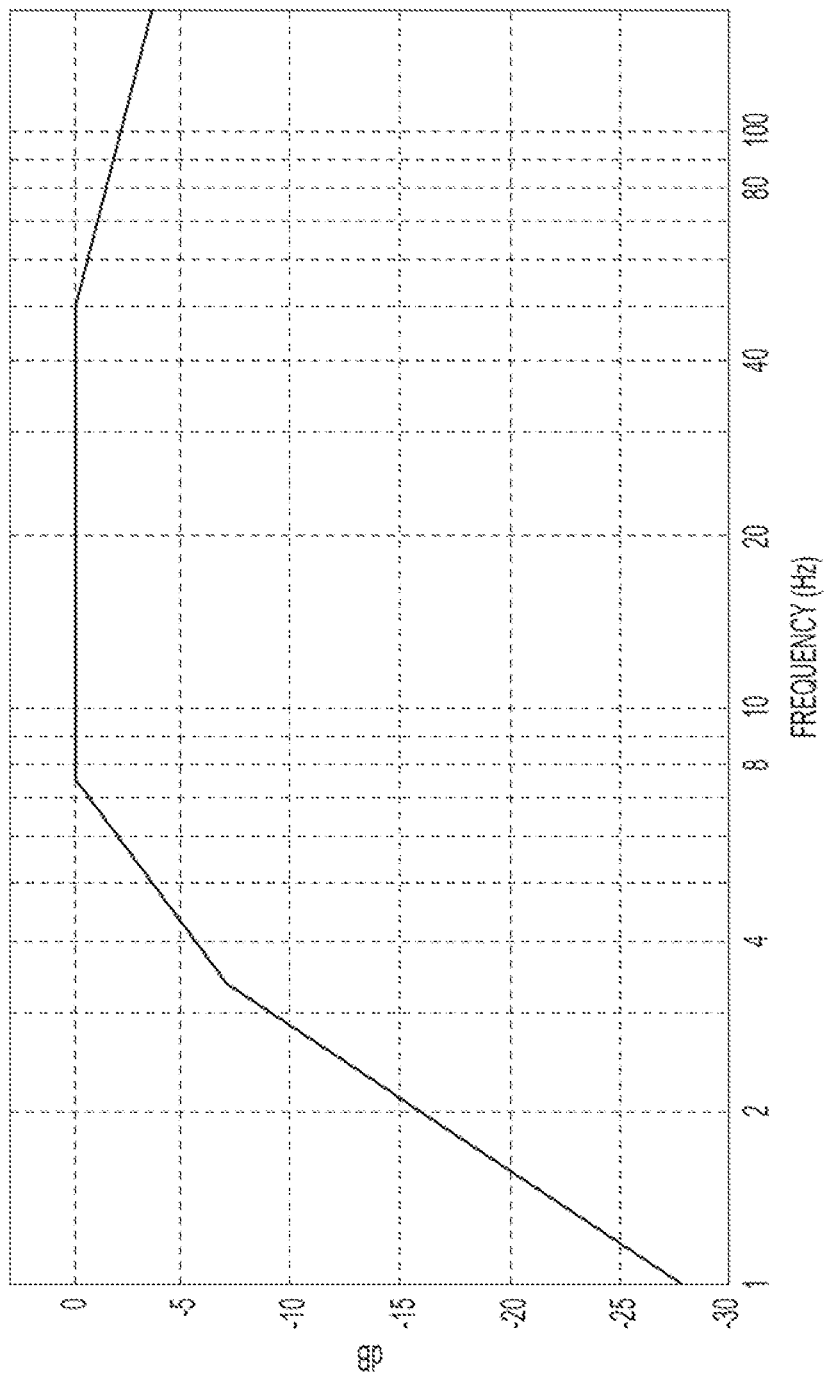
FIG. 8 illustrates a sweep amplitude for an example determination of a new sweep rate using the systems and methods according to exemplary embodiments.

The vibrator characteristics lead to—$f_{flow}$=7.5 Hz, $f_{stroke}$5 Hz, and wherein $f_c$ is set equal to 50 Hz, with k=⅓. The corresponding sweep amplitude $\rho_{fs}$ is shown in FIG. 8.

According to further exemplary embodiments, anti-aliasing and low frequency noise correlation can be neglected in determining $A_m$ where ($A_m=f_{ref}/f$). In this case, the source radiation factor and the migration factor exactly cancel each other.

Equation 13 then becomes:

$$Sr_{new} = 5\left(1.75\sqrt{N(50)/N} \exp\left(\frac{-\pi t_t}{Q_a}(f-50)\right)\frac{f}{50}\rho_{fs}(f)\frac{50}{f}\right)^2. \quad \text{Eq. (14)}$$

Figure 9:
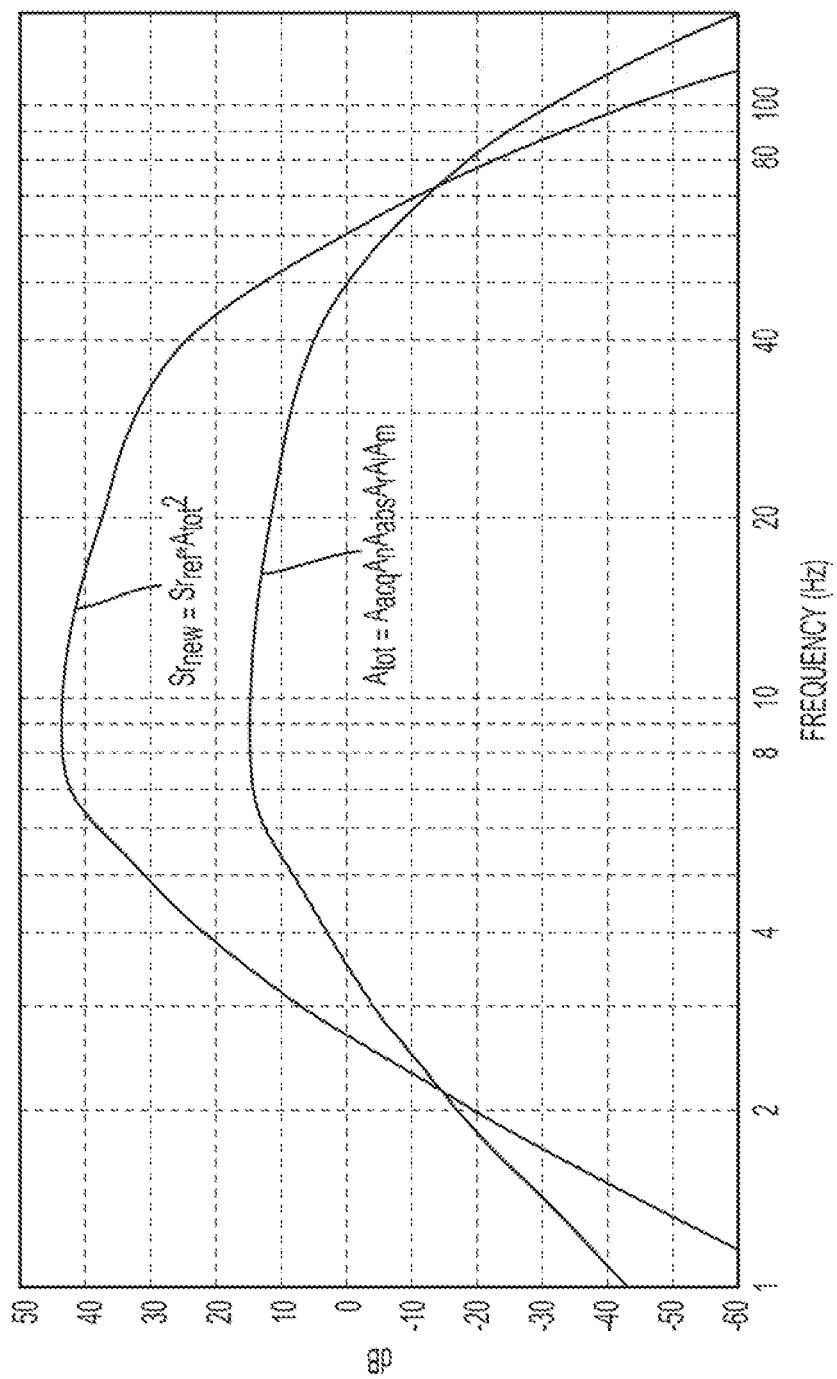
FIG. 9 illustrates a signal-to-noise ratio increase relative to a reference acquisition to obtain a flat spectrum of a target reflection at 1.4 seconds according to an exemplary embodiment, and is the square root of $Sr_{new}$.
Figure 10:
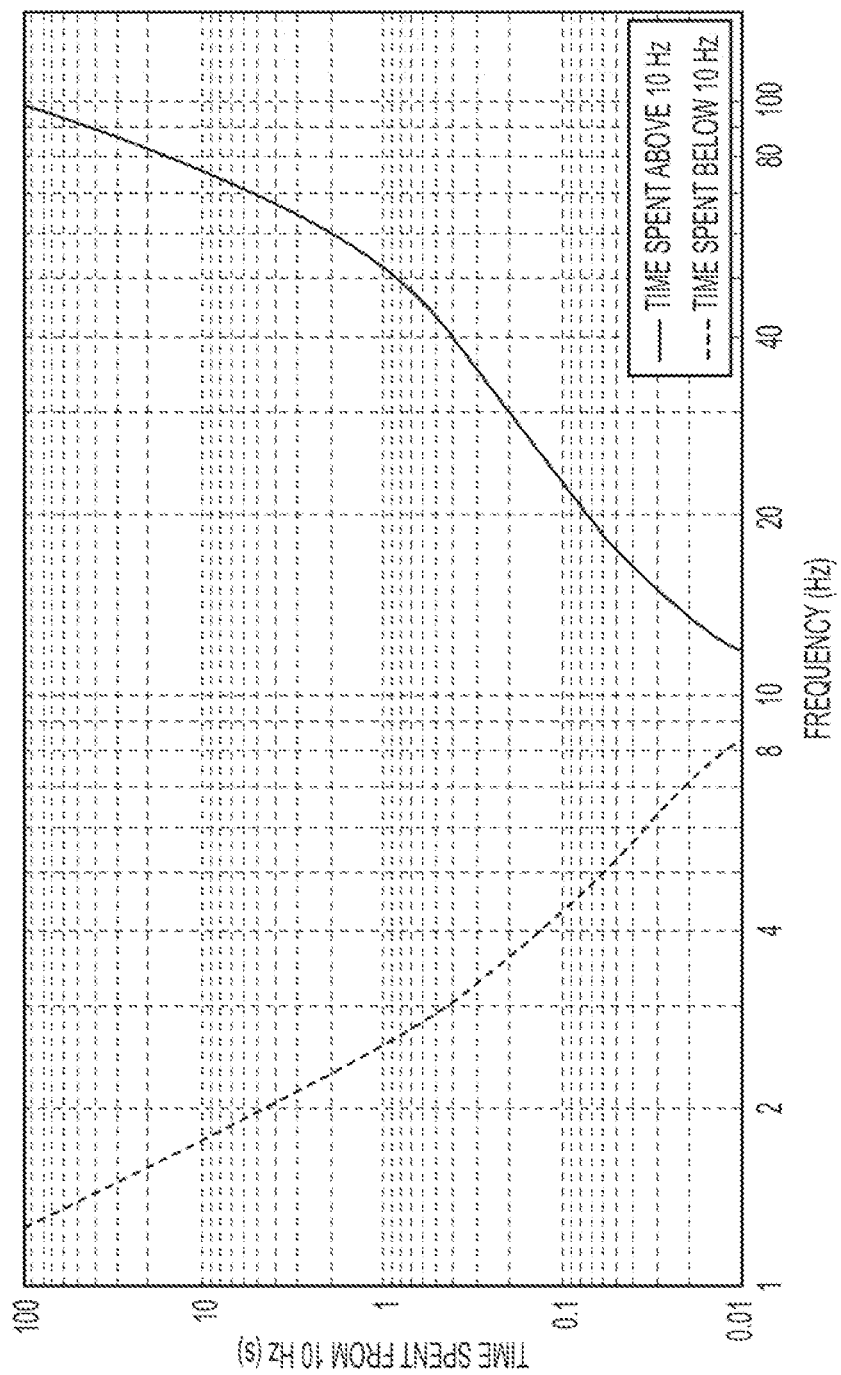
FIG. 10 illustrates a time period for a sweep length towards low frequencies and a sweep length towards high frequencies according to an exemplary embodiment.

FIG. 9 illustrates a signal-to-noise ratio increase relative to a reference acquisition to obtain a flat spectrum of a target reflection at 1.4 seconds according to an exemplary embodiment, and is the square root of $Sr_{new}$. To choose the sweep length, it is convenient to separately analyze the time necessary to extend the sweep range toward low frequencies and high frequencies. This is shown in FIG. 10 in which the solid line gives the sweep time above 10 Hz, and the dashed line provides the sweep time below 10 Hz.

Extending the reference low-frequency limit to 4 Hz only costs about 1 minute/km². Starting at 2 Hz requires a significantly larger effort (about ½ hour/km²). Likewise, a 60-Hz high-frequency limit is quite affordable (about 14 minutes/km² spent between 10 and 60 Hz); it would actually require less sweep time than the reference acquisition (20 minutes/km²). However, an 80-Hz high-frequency limit results in a significant cost (about 1 hour and 48 minutes/km² spent between 10 and 80 Hz).

According to further exemplary embodiment, the same production technique used in the reference acquisition can be used to record the new survey, but in this case, it would lead to an increase in acquisition time that may seem unreasonable especially if the frequency range is significantly widened. However, taking advantage of simultaneous acquisition techniques such as V1 (Postel et al., 2008, "V1: Implementation and Application of Single-Vibrator Acquisition", The Leading Edge, 27, no. 5, 604-608, the entire contents of which are incorporated herein by reference), or ISS (Howe et al., 2008, "Independent Simultaneous Sweeping—A Method to Increase the Productivity of Land Seismic Crews", presented at the 78th Annual International Meeting, SEG, 2008, the entire contents of which are incorporated herein by reference) will make this increase affordable in terms of time spent per $km^2$. Further, in 2010, P. Pecholcs reported a simultaneous acquisition experiment in which a total of more than 160 hours of simultaneous vibrations were acquired in a single day (See, Pecholcs, P. et. al, 2010, "Over 40,000 VPS Per Day—With Real-Time Quality Control: Opportunities and Challenges", presented at the 80th Annual International Meeting, SEG, the entire contents of which are incorporated herein by reference). In the present example described herein according to further exemplary embodiment, for a flat spectrum stretching from 2 to 80 Hz on the target reflection, this productivity would make it possible to record 78 $km^2$ in a day. In addition, the trace density increase of the new acquisition will result in better organized noise reduction in the low frequency extension of the spectrum and better spatial sampling to take full advantage of pre-stack migration and properly image steeper dips in higher frequency range.

According to exemplary embodiments, bandwidth extension in Vibroseis data involves the use of very low sweep rates in the edges of the data bandwidth. One consequence can be a significant lengthening of sweep time. Many factors other than the sweep rate affect the Signal-to-ambient-Noise ratio. It is necessary to take them all into account to optimize the benefit of sweeps with variable sweep rates. The combination of bandwidth extension with simultaneous acquisition techniques can limit or even avoid acquisition time increase.

Figure 11:
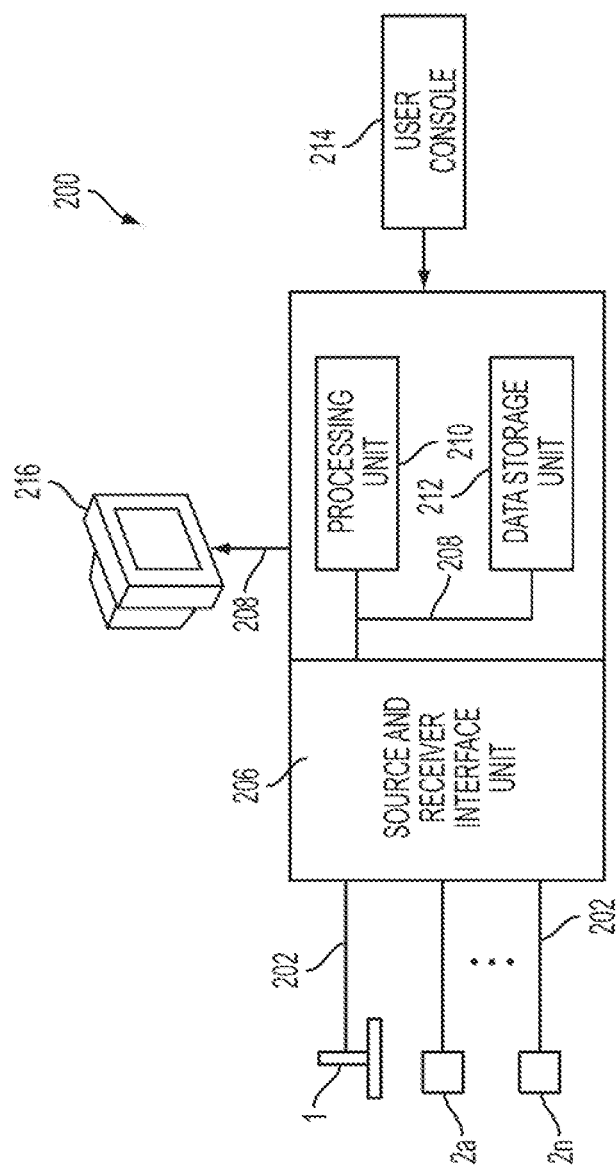
FIG. 11 illustrates a seismic data acquisition system suitable for use to implement a method for determining a new sweep rate that combines low-frequency sweep rate modifications to compensate for vibrator limitations, low-frequency modifications to compensate for vibrator far-field response characteristics, and high-frequency modifications to compensate for absorption according to an exemplary embodiment.

FIG. 11 illustrates a seismic data acquisition system 200 suitable for use to implement a method for determining a new sweep rate that combines low-frequency sweep rate modifications to compensate for vibrator limitations, low-frequency modifications to compensate for vibrator far-field response characteristics, and high-frequency modifications to compensate for absorption according to an exemplary embodiment. A user console 214 (for example: a keyboard, buttons, switches, touch screen and/or joy stick) provides a means for personnel to enter commands and configuration into the system. Display device 216 can be used to show: streamer position, visual representations of acquired data, source and receiver status information, survey information and other information important to the seismic data acquisition process. Source and receiver interface unit 206 receives the seismic data from receivers 2a-2n, through communication conduit 202. Source and receiver interface unit 206 also communicates bi-directionally with sources 1 through the source communication conduit 202. Source excitation, source control signals, measured source output signal, source status information can be exchanged through this link between the seismic data acquisition system 200 and the vibrator controller, not shown in the figures. User console 214, source and receiver interface unit 206, processing unit 210, data storage unit 212 and display 216 are all linked together through a seismic data acquisition system communication bus (bus) 208. Bus 208 allows a data pathway for things like: the transfer and storage of data that originate from either the source sensors or streamer receivers; for processing unit 210 to access stored data contained in data storage unit memory 212; for processing unit 210 to send information for visual display to the display 216; or for the user to send commands to system operating programs that might reside in either the processing unit 210 or the source and receiver interface unit 206.

Figure 12:
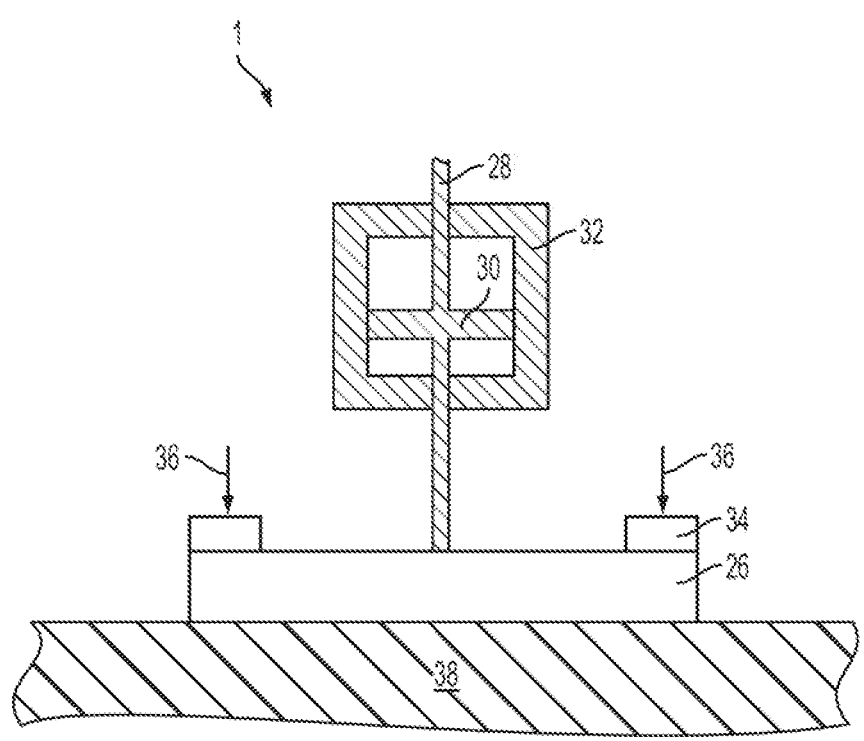
FIG. 12 illustrates a source element for use with the seismic data acquisition system shown in FIG. 11 suitable for use to implement the method illustrated in FIG. 6 for determining a new sweep rate according to an exemplary embodiment.

An example of a vibratory source 1 is shown in FIG. 12. Source 1 can include base plate 26 that connects to rod 28. Rod 28 includes piston 30 inside reaction mass 32. Insulation devices 34 can be provided on base plate 26 to transmit weight 36 of vehicle 22 to base plate 26. Base plate 26 is shown in FIG. 14 as lying on ground 38. The force transmitted to the ground is equal to the mass of the base plate times its acceleration, plus the weight of the reaction mass times its acceleration. The weight of the vehicle (shown in FIG. 1) prevents the base plate from losing contact with the ground. Many designs for the vibratory source exist on the market, and any one of them may be used with the novel features discussed herein.

Figure 13:
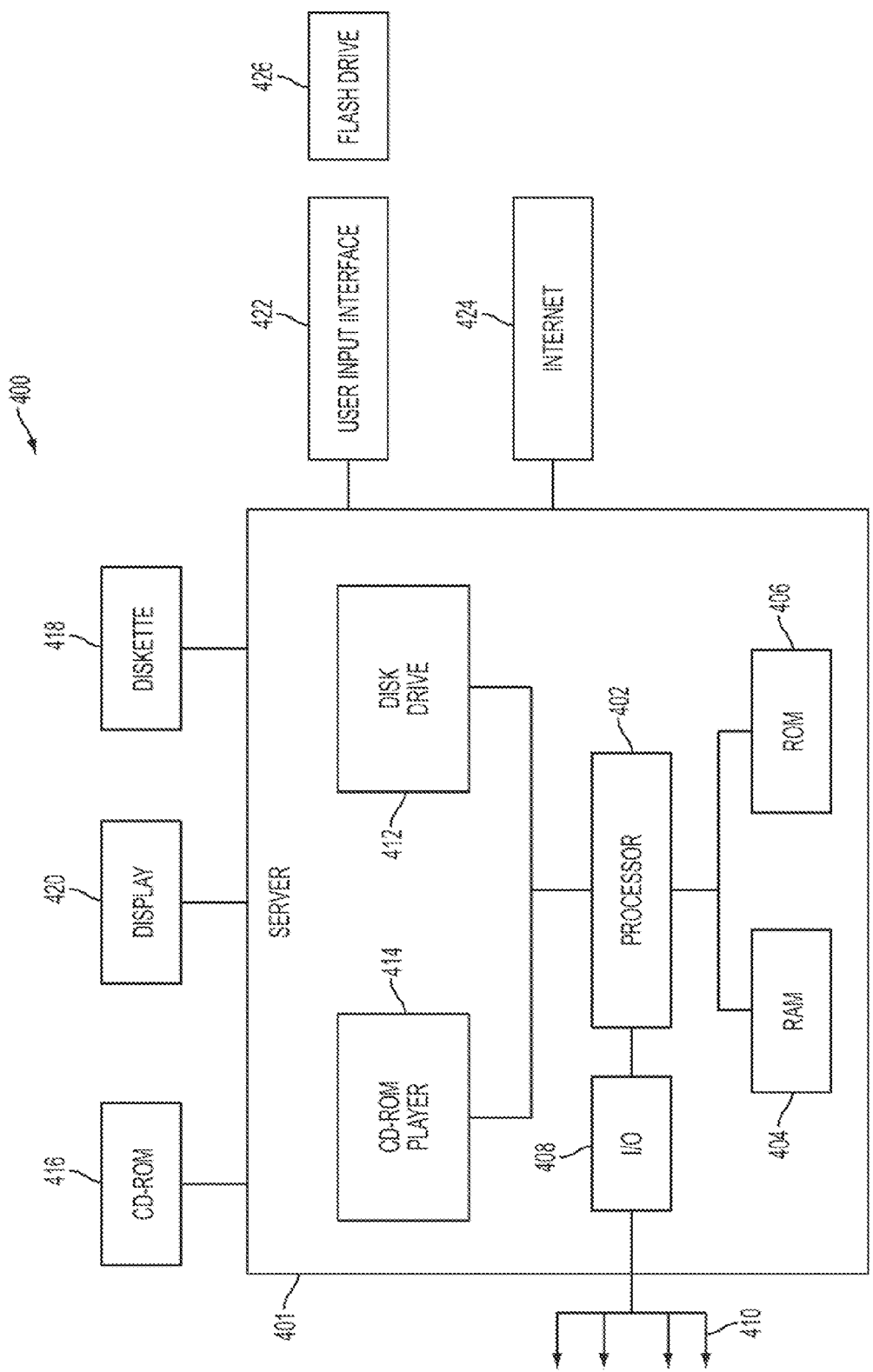
FIG. 13 is a block diagram of a circuit that can be used to implement a method for determining a new sweep rate that combines low-frequency sweep rate modifications to compensate for vibrator limitations, low-frequency modifications to compensate for vibrator far-field response characteristics, and high-frequency modifications to compensate for absorption according to an exemplary embodiment.

FIG. 13 is a block diagram of a circuit 400 that can be used to implement a method for determining a new sweep rate that combines low-frequency sweep rate modifications to compensate for vibrator limitations, low-frequency modifications to compensate for vibrator far-field response characteristics, and high-frequency modifications to compensate for absorption according to an exemplary embodiment. An example of a representative control system 400 capable of carrying out operations in accordance with the exemplary embodiments discussed above is illustrated in FIG. 13. Hardware, firmware, software or a combination thereof may be used to perform the various steps and operations described herein.

Exemplary control system (control system) 400 suitable for performing the activities described in the exemplary embodiments may include server 401. Such a server 401 can include central processor unit (CPU) 402 coupled to random access memory (RAM) 404 and to read-only memory (ROM) 406. ROM 406 can also be other types of storage media to store programs, such as programmable ROM (PROM), erasable PROM (EPROM), etc. Processor 402 can communicate with other internal and external components through input/output (I/O) circuitry 408 and bussing 410, to provide control signals and the like. For example, processor 402 can communicate with the sensors, electro-magnetic actuator system, and/or the pneumatic mechanism. Processor 402 carries out a variety of functions as is known in the art, as dictated by software and/or firmware instructions.

Server 401 can also include one or more data storage devices, including hard and floppy disk drives 412, CD-ROM drives 414, and other hardware capable of reading and/or storing information such as a DVD, etc. According to an exemplary embodiment, software for carrying out the above discussed steps can be stored and distributed on CD-ROM 416, diskette 418, or other form of media capable of portably storing information (e.g., universal serial bus (USB) flash drive 426). These storage media may be inserted into, and read by, devices such as the CD-ROM drive 414, the disk drive 412, etc. Server 401 can be coupled to display 420, which may be any type of known display or presentation screen, such as liquid crystal displays (LCDs), plasma displays, cathode ray tubes (CRTs), etc. User input interface 422 is provided, including one or more user interface mechanisms such as a mouse, keyboard, microphone, touch pad, touch screen, voice-recognition system, among other devices.

Server 401 can be coupled to other computing devices, such as the equipment of a vessel, via a network. The server may be part of a larger network configuration as in a global area network (GAN) such as Internet 428, which allows ultimate connection to the various landline and/or mobile client/watcher devices.

As also will be appreciated by one skilled in the art, the various functional aspects of the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the exemplary embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the exemplary embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present exemplary embodiments can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present exemplary embodiments pertains.

The disclosed exemplary embodiments provide a source array, computer software, and a method for generating a driving signal for marine vibrational sources. It should be understood that this description is not intended to limit the exemplary embodiments. On the contrary, the exemplary embodiments are intended to cover alternatives, modifications, and equivalents, which are included in the spirit and scope of the exemplary embodiments as defined by the appended claims. Further, in the detailed description of the exemplary embodiments, numerous specific details are set forth to provide a comprehensive understanding of the claimed exemplary embodiments. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described exemplary embodiments are intended to be illustrative in all respects, rather than restrictive, of the present exemplary embodiments. Thus the present exemplary embodiments is capable of many variations in detailed implementation that can be derived from the description contained herein by a person skilled in the art. No element, act, or instruction used in the description of the present application should be construed as critical or essential to the exemplary embodiments unless explicitly described as such. Also, as used herein, the article "a" is intended to include one or more items.

I claim:

1. A method for generating a frequency sweep signal set for a vibrator source for use in seismic data gathering, the method comprising:
    selecting a reference frequency;
    calculating a reference sweep rate based on the reference frequency;
    calculating a first low frequency sweep rate modifications to compensate for vibrator limitations;
    calculating a second low frequency sweep rate modification to compensate for vibrator far-field responses;
    calculating a high frequency sweep rate modifications to compensate for absorption; and
    generating the frequency sweep signal set based on the reference sweep rate, the first low frequency sweep rate modification, the second frequency sweep rate modification, and the high frequency sweep rate modification.

2. The method according to claim 1, further comprising:
    determining the reference sweep rate from a plurality of reference acquisition parameters;
    determining a new source radiation parameter $A_r$;
    determining a new acquisition parameter $A_{acq}$ from the plurality of reference acquisition parameters and a plurality of new acquisition parameter factors;
    determining an ambient noise acquisition parameter $A_n$;
    determining a vibrator limitation parameter $A_l$;
    determining an absorption parameter $A_{abs}$;
    determining a migration effect parameter $A_m$; and
    calculating a new sweep rate $Sr_{new}$ based on the reference sweep rate and the determined parameters.

3. The method according to claim 2, further comprising:
    determining a range of reference sweep frequencies, wherein the reference frequency and the range of reference sweep frequencies are used to calculate the parameters.

4. The method according to claim 2, wherein a reference noise parameter Nref is determined by taking the median power spectral density of an ambient noise parameter $N_{new}(f)$, or by determining $N_{ref}$ equals $N_{new}(f_{ref})$.

5. The method according to claim 2, wherein the step of determining a new source radiation parameter $A_r$ comprises:
    calculating the equation $$A_r = \frac{f}{f_{ref}}.$$

6. The method according to claim 2, wherein the step of determining a new acquisition parameter $A_{acq}$ comprises:
    calculating the equation $$A_{acq} = \frac{Pf_{new} D_{new} Nv_{new} \sqrt{Nr_{new} Sd_{new} Ra_{new}}}{Pf_{ref} D_{ref} Nv_{ref} \sqrt{Nr_{ref} Sd_{ref} Ra_{ref}}}.$$

7. The method according to claim 2, wherein the step of determining an ambient noise acquisition parameter $A_n$ comprises:
    calculating the equation $$A_n = \sqrt{\frac{N_{ref}}{N_{new}(f)}}.$$

8. The method according to claim 2, wherein the step of determining a vibrator limitation parameter $A_l$ comprises:
    calculating the equation $$A_l = \frac{\rho_{fs}(f)}{\rho_{fs}(f_{ref})}.$$

9. The method according to claim 2, wherein the step of determining an absorption parameter $A_{abs}$ comprises:
    calculating the equation $$A_{abs} = \exp\left(\frac{-\pi t_t}{Q_a}(f - f_{ref})\right).$$

10. The method according to claim 2, wherein the step of determining a migration effect parameter $A_m$ comprises:
    calculating the equation $$A_m = \frac{m_{new}(f)}{m_{ref}(f_{ref})}.$$

11. The method according to claim 2, wherein the step of calculating the new sweep rate $Sr_{new}$ comprises:
    calculating the equation $$Sr_{new} = Sr_{ref}(A_{acq} A_n A_{abs} A_r A_l A_m)^2.$$

12. The method according to claim 1, further comprising:
    providing the frequency sweep signal to the seismic vibrator;
    driving the seismic vibrator to transmit a drive signal;
    receiving seismic data based on the transmitted drive signal by a receiver; and
    analyzing the received seismic data to determine the presence or not of hydrocarbon deposits.

13. A system for generating a frequency sweep signal set for a seismic vibrator for use in seismic data gathering comprising:
    a processor configured to,
    receive a reference frequency,
    calculate a reference sweep rate based on the reference frequency;
    calculate a first low frequency sweep rate modifications to compensate for vibrator limitations;
    calculate a second low frequency sweep rate modification to compensate for vibrator far-field responses;
    calculate a high frequency sweep rate modifications to compensate for absorption, and
    generate the frequency sweep signal set based on the reference sweep rate, the first low frequency sweep rate modification, the second frequency rate modification, and the high frequency sweep rate modification.

14. The system according to claim 13, further comprising:
the processor being further configured to determine the reference sweep rate from a plurality of reference acquisition parameters;
determine a new source radiation parameter $A_r$;
determine a new acquisition parameter $A_{acq}$ from the plurality of reference acquisition parameters and a plurality of new acquisition parameter factors;
determine an ambient noise acquisition parameter $A_n$;
determine a vibrator limitation parameter $A_l$;
determine an absorption parameter $A_{abs}$;
determine a migration effect parameter $A_m$; and
calculate a new sweep rate $Sr_{new}$ based on the reference sweep rate and the determined parameters.

15. The system according to claim 14, wherein
the processor is further configured to
determine a range of reference sweep frequencies, wherein the reference frequency and the range of reference sweep frequencies are used to calculate the parameters.

16. The system according to claim 14, wherein a reference noise parameter Nref is determined by taking the median power spectral density of an ambient noise parameter $N_{new}(f)$, or by determining $N_{ref}$ equals $N_{new}(f_{ref})$.

17. The system according to claim 14, wherein the processor determines a new source radiation parameter $A_r$ by calculating the equation $$A_r = \frac{f}{f_{ref}}.$$

18. The system according to claim 14, wherein the processor determines a new acquisition parameter $A_{acq}$ by calculating the equation $$A_{acq} = \frac{Pf_{new} D_{new} Nv_{new} \sqrt{Nr_{new} Sd_{new} Ra_{new}}}{Pf_{ref} D_{ref} Nv_{ref} \sqrt{Nr_{ref} Sd_{ref} Ra_{ref}}}.$$

19. The system according to claim 14, wherein the processor determines an ambient noise acquisition parameter $A_n$ by calculating the equation $$A_n = \sqrt{\frac{N_{ref}}{N_{new}(f)}}.$$

20. The system according to claim 14, wherein the processor determines a vibrator limitation parameter $A_l$ by calculating the equation $$A_l = \frac{\rho_{fs}(f)}{\rho_{fs}(f_{ref})}.$$

21. The system according to claim 14, wherein the processor determines an absorption parameter $A_{abs}$ by calculating the equation $$A_{abs} = \exp\left(\frac{-\pi t_t}{Q_a}(f - f_{ref})\right).$$

22. The system according to claim 14, wherein the processor determines a migration effect parameter $A_m$ by calculating the equation $$A_m = \frac{m_{new}(f)}{m_{ref}(f_{ref})}.$$

23. The system according to claim 14, wherein the processor determines the new sweep rate $Sr_{new}$ by calculating the equation $$Sr_{new} = sr_{ref}(A_{acq} A_n A_{abs} A_r A_l A_m)^2.$$

24. The system according to claim 13, wherein
the processor is further configured to provide the frequency sweep signal to the seismic vibrator;
drive the seismic vibrator to transmit a drive signal;
receive seismic data based on the transmitted drive signal by a receiver; and
analyze the received seismic data to determine the presence or not of hydrocarbon deposits.

* * * * *